United States Patent [19]
Kos

[11] 4,032,925
[45] June 28, 1977

[54] DRIVE CIRCUIT FOR THERMAL PRINTING ARRAY

[75] Inventor: Steven Kos, Ottawa, Canada

[73] Assignee: Northern Telecom Limited, Montreal, Canada

[22] Filed: May 10, 1976

[21] Appl. No.: 684,568

[52] U.S. Cl. .............................. 346/76 R; 219/216
[51] Int. Cl.² ........................................ G01D 15/10
[58] Field of Search ............... 346/76 R; 219/216; 197/1 R; 340/324 M

[56] References Cited
UNITED STATES PATENTS 3,354,817  11/1967  Sakurai .............................. 107/93
3,938,136  2/1976  Kawakami ..................... 340/324 M

*Primary Examiner*—Joseph W. Hartary
*Attorney, Agent, or Firm*—John E. Mowle

[57] ABSTRACT

A drive circuit for a matrix coupled thermal printing bar which permits the address of large arrays as would be used in a thermal facsimile printing system without the necessity for individually driving each element or providing isolated diodes to prevent leakage paths. The circuit utilizes the application of an intermediate voltage to the unaccessed rows or columns to limit the applied power to the unaccessed elements below that required to raise them to printing temperatures.

4 Claims, 1 Drawing Figure

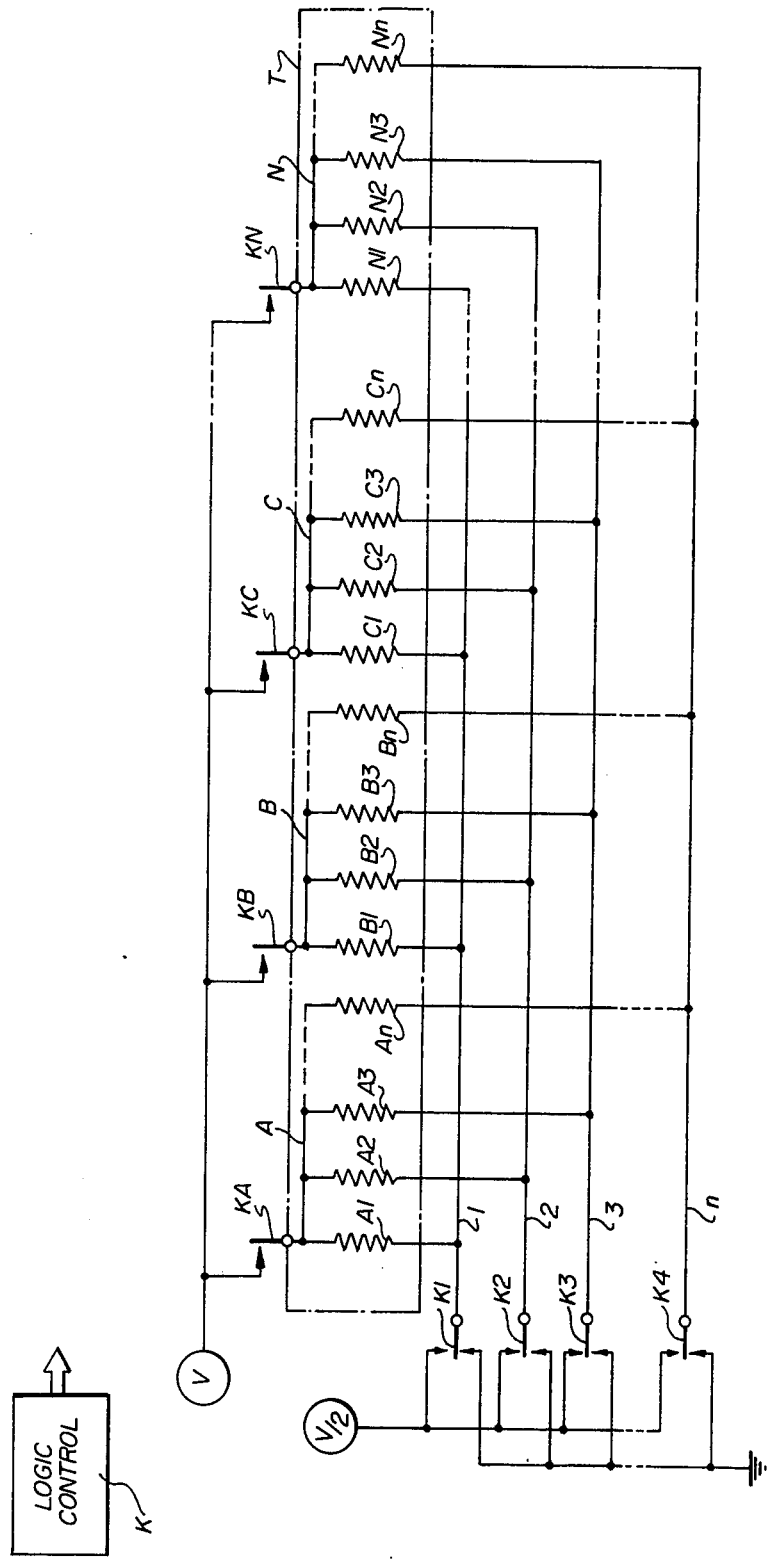

DRIVE CIRCUIT FOR THERMAL PRINTING ARRAY

This invention relates to a drive circuit for a matrix connected thermal printing array used in a thermal facsimile printing system, and more particularly to one which inhibits the thermal resistance elements in leakage paths of the matrix from reaching printing temperatures without utilizing isolating diodes for each element.

BACKGROUND OF THE INVENTION

A thermal printing head is an array of contiguous thermal resistance elements. By selectively passing an electric circuit through certain of the elements while a heat sensitive paper is progressively advanced over the top of the head, facsimile printing can be achieved.

One arrangement for driving the head is to individually access each thermal resistance element. This is generally accomplished by utilizing a current sinking transistor for each resistive element. Because of the large number of interconnecting leads required, the transistor elements and the accompanying decoding logic must be mounted on the thermal head, resulting in a relatively costly and complex structure.

An alternate arrangemment is to connect the array as a matrix of rows and columns. Printing is then achieved by simultaneously applying a voltage between say one of the columns and selected ones of the rows, and thereafter sequentially repeating the operation until all columns have been accessed to print one complete line. The heat sensitive paper is then advanced relative to the head after which the operation is repeated to print the following line.

This matrix arrangement contains a large number of paralleled leakage paths which under certain operating conditions can result in sufficient voltage drop across certain of the unaccessed elements to cause spurious printing. One arrangement which circumvents this utilizes a diode connected in series with each thermal printing element which blocks the applied d-c voltage from passing through the reverse leakage paths. With large arrays such as those containing over 1,000 elements, the mounting and connection of these diodes to the thermal elements requires a large number of bonds which increase costs and reduce reliability.

In an alternate arrangement the balance of the rows are connected to one intermediate source and the columns to a second intermediate source; e.g., voltage sources of one-third and two-thirds that applied to the selected elements. Under these conditions, the power in any one of the balance of the elements in the leakage paths is one-ninth that applied to the selected elements; well below that required to raise these elements to their printing threshold temperature, so that no spurious printing results. This is similar to the arrangement described in U.S. Pat. No. 3,938,136 entitled "Method and Device for Driving a Matrix Type Liquid Crystal Display Element" issued Feb. 10, 1976 and invented by Hideaki Kawakami, which it utilized to reduce crosstalk in a liquid crystal display. While this arrangement minimizes the power applied to each individual leakage element in the thermal array, the overall power may be relatively high since each of these leakage elements has the same voltage applied thereto. This can be of particular concern in a large matrix array as it substantially increases the power requirements of the drive circuitry.

STATEMENT OF THE INVENTION

The present invention is based on the realization that a substantial reduction in power is achieved by applying an intermediate voltage to the unaccessed points in one coordinate of the array, while allowing the unaccessed points in the other coordinate to float. With this arrangement the balance of the thermal resistance elements in the leakage paths do not reach their printing temperature threshold. Thus, in accordance with the present invention there is provided a drive circit for a thermal printing array having a plurality of thermal resistance elements connected in a matrix of rows and columns. The drive circuit comprises a control circuit for connecting a first source of voltage between a single column and selected ones of the rows to heat selected thermal resistance elements connected directly therebetween to printing temperatures. The control circuit concurrently connects the balance of the rows to a second source of voltage which is intermediate that of said first source, while the balance of the columns float. This maintains the balance of the thermal resistance elements in the array below printing temperatures. Thus, when the intermediate voltage is one-half that applied to the selected elements, the power in any one of the leakage path elements is no greater than one-quarter that applied to the selected elements. In practice, the control circuit sequentially repeats the operation until all columns have been accessed after which the operation is repeated. In addition to utilizing less power, the drive circuitry for such an array is simpler than that required when both the rows and columns are connected to intermediate voltage sources.

BRIEF DESCRIPTION OF THE DRAWING

An example embodiment of the invention will now be described with reference to the single FIGURE of drawings which illustrates a block and schematic circuit diagram of a drive circuit for a matrix connected thermal printing array.

DESCRIPTION OF THE PREFERRED EMBODIMENT

Referring to the single FIGURE, the thermal printing array T comprises a plurality of thermal resistance elements A1, A2 - - - Nn which are connected in a matrix of rows 1, 2, 3 - - - n and columns A, B, C - - - N. The elements are generally realized in thin or thick fim technology. While each of the elements A1, A2 - - - Nn is shown as being separate and distinct, they may be constructed as part of a contiguous bar of elements as illustrated in applicant's copending application Ser. No. 638,611 entitled: "Thermal Printing Device" invented by D. R. Baraff et al, filed Dec. 8, 1975.

Each of the columns A, B, C - - - N is connected through a selector switch KA, KB, KC - - - KN respectively, to a source of voltage V. However, each of the rows 1, 2, 3 - - - n is connected through a selector switch K1, K2, K3 - - - Kn respectively, to either a source of voltage V/2 or ground. All of the selector switches are under control of a logic control circuit K. For simplicity, the switches are illustrated as being mechanically actuated. However, in a practical embodiment, semiconductor gating circuitry would normally be utilized to provide rapid and reliable control of the voltages applied to the thermal printing array T.

In operation the voltage source V is first applied between a single column A and selected ones of the rows 1, 2, 3 - - - n to raise the temperature of the elements A1, A2, A3 - - - An at the selected junctions thereof to printing temperatures while heat sensitive paper (not shown) is held in contact therewith. The operation is sequentially repeated for columns B through N with selected combinations of rows, all under control of the logic control circuitry K. While each of the selected elements in one column is accessed by grounding the associated rows, the balance of the rows are connected to the intermediate voltage source V/2, in order to prevent spurious printing by other elements in the leakage paths. Once all columns have been accessed, the heat sensitive paper (not shown) is advanced and the operation repeated to print the following line.

In the following example, a voltage sufficient to raise the thermal resistance elements A1, A2 - - - Nn to printing temperatures is designated V; the other voltage level V/2 is designated with respect to this voltage V. Assume that a source of voltage V is to be initially applied to selected printing elements A1 and A3 in column A. Switch KA is connected to source V while all other switches in the columns KB, KC - - - KN remain open under control of the logic control circuitry K. Concurrently switches K1 and K3 are connected to ground while the balance of the switches K2 - - - Kn are connected to a source of voltage V/2. The power applied to the selected elements A1 and A3 in column A is equal to $V^2/R$, where R is the resistance of each element. If the remainder of the rows and columns were both allowed to float, the paralleling effect of the thermal elements in the other columns B, C - - - N could cause the remainder of the elements in column A to rise to printing temperatures. This effect is particularly pronounced when the majority of the elements in column A are directly accessed and only a few receive power through the leakage paths. However, because the balance of the rows K2 - - - Kn are tied to a voltage source V/2, and the balance of the columns KB, KC - - - KN are permitted to float, the maximum power dissipated in each unaccessed element is limited to $V^2/4R$. This is below that required to raise the temperature of these thermal resistance elements to printing temperatures and hence only those elements A1 and A3 which are directly connected between voltage source V and ground are raised to printing temperatures.

For a square matrix of Y.Y rows and columns, in which $x$ selected elements in a single column are accessed at any one time, the total power P applied to the array is:

$$P = xp + p\frac{(Y-x)}{4} + \frac{px(Y-x)(Y-1)}{4Y} \quad (1)$$

where: $p = V^2/R$ the power applied to each of the selected elements $x$.

In a prior art structure of the type described in the above-mentioned patent to Kawakami where intermediate voltages of V/3 and 2V/3 are applied to both the columns and rows respectively, the total power P applied to the array is:

$$P = xp + \frac{(Y^2-x)}{9}p \quad (2)$$

The saving in power of the present invention over this prior arrangement will be evident from the following comparison of several examples of a 40 × 40 matrix array when applied to equations (1) and (2) above.

| Y = 40 | | $p = V^2/R$ |
|---|---|---|
| | TOTAL POWER = P | |
| x | PRIOR ART | PRESENT INVENTION |
| 1 | 178.6p | 20.2p |
| 20 | 195.5p | 122.5p |
| 39 | 212.4p | 48.7p |

It will be evident that the intermediate voltage applied to all the unaccessed rows need not necessarily be one-half that applied to the accessed columns. The main criteria is that the intermediate voltage be such that none of the elements in the leakage paths rise to printing temperatures.

In a typical non-limiting example, a thermal printing bar of the type illustrated in the above-mentioned application to D. R. Baraff et al has a density of about 80 elements per centimeter. Thick film technology is utilized in the construction of the bar with each element having a resistance of approximately 1.5 Kohms. Satisfactory printing temperatures, for a heat sensitive paper having a printing threshold of 120° C and a normal printing temperature of 180° C, were obtained with the applicaton of voltages V = 38 volts and V/2 = 19 volts for a period of one millisecond to the elements, without any resultant smearing. All unaccessed columns were allowed to float. The application of this intermediate voltage tends to preheat the thermal printing bar thus reducing the time required to raise the elements to printing temperatures. This secondary effects permits an increase in the attainable writing speed of the array.

In the foregoing detailed description, a single column is accessed in conjunction with a plurality of rows at any one time. It will be evident that this designation is purely arbitrary and that the arrangement could be reversed with a single row being accessed in conjunction with a plurality of columns. With this latter arrangement, the balance of the columns as opposed to the rows would be connected to the intermediate source of voltage.

What is claimed is:

1. In a drive circuit for a thermal printing array having a plurality of thermal resistance elements connected in a matrix of rows and columns;

the drive circuit comprising:
   means for connecting a first source of voltage between a single column and selected ones of said rows to heat selected thermal resistance elements connected directly therebetween to printing temperatures;

the improvement comprising:
   means for concurrently connecting only the balance of the rows to a second source of voltage intermediate that of said first source, to maintain the balance of the thermal resistance elements in the array below said printing temperatures.

2. A drive circuit as defined in claim 1 in which the voltage of said second source of voltage is about one-half that of said first source of voltage whereby the power applied to any one of said balance of the thermal resistance elements is not greater than about one-quarter that applied to said selected elements.

3. In a drive circuit for a thermal printing array having a plurality of contiguous thermal-printing elements connected in a matrix of rows and columns;
the drive circuit comprising:
means for sequentially connecting a first source of voltage to each column with respect to selected ones of said rows to heat selected thermal resistance elements connected directly therebetween to printing temperatures;
the improvement comprising:
means for concurrently connecting the balance of the rows to a second source of voltage with respect to said selected rows while the balance of the columns float, said second source being less than said first source, to maintain the balance of the thermal resistance elements below said printing temperatures.

4. A drive circuit as defined in claim 3 in which the voltage of said second source of voltage is about one-half that of said first source of voltage, whereby the power applied to any one of said balance of the thermal resistance elements is not greater than about one-quarter that applied to said selected elements.

* * * * *